Feb. 23, 1960    J. L. BOWER    2,926,335
ELECTRONIC DIRECTION CIRCUIT
Filed March 2, 1956    5 Sheets-Sheet 1

INVENTOR.
JOHN L. BOWER
BY William L. Lane
ATTORNEY

United States Patent Office 2,926,335
Patented Feb. 23, 1960

2,926,335

ELECTRONIC DIRECTION CIRCUIT

John L. Bower, Downey, Calif., assignor to North American Aviation, Inc.

Application March 2, 1956, Serial No. 569,209

12 Claims. (Cl. 340—170)

This invention relates to an electronic circuit providing an analysis of input signals and providing an indication of the concurrence of predetermined values and changes in values of said signals. More specifically, this device is adapted to receive digital signals from a plurality of transducers and provide at its output signals representing the quantity indicated by said transducers and the sense of the quantity indicated.

An electrical signal may be analogue in form, that is, it is variable continuously over its range. An electrical signal may also be digital in form, that is, it is variable only in discrete, readily-distinguishable steps or pulses. The advantage of digital signals over analogue signals lies in certainty of distinguishment between successive steps or qualities. However, one shortcoming of a digital system is that it lacks information between successive digital increments. Another shortcoming is that many digital systems are not easily adapted to provide an indication of sense.

This invention is a circuit capable of receiving digital signals representing a quantity such as motion and provide an output digital signal from which can be determined the amount of motion and the sense (direction of motion). In addition, this device provides an increased resolution, effecting an indication of motion with greater resolution than the resolution of its signals. As a result, an accuracy considerably greater than the customary accuracy of a similar digital system is obtained.

It is therefore an object of this invention to provide a digital electronic circuit providing increased accuracy in indication.

It is another object of this invention to provide an electronic circuit capable of analyzing electrical signals to obtain information contained therein.

Another object of this invention is to provide an electronic circuit responsive to the concurrence of predetermined values of a digital signal and changes in values of a digital signal to provide an indication thereof.

Still another object of this invention is to provide an electronic circuit receiving a plurality of input digital signals and provide an output in accordance with the relative values of said digital signals and changes in values of said signals.

A still further object of this invention is to provide an electronic circuit which receives signals representing a quantity such as motion and direction of motion and provides an output signal in digital form representing a quantity such as motion and direction of motion.

Other objects of invention will become apparent from the following description taken in connection with the accompanying drawings, in which Fig. 1 is a schematic diagram illustrating a possible use of the device of the invention;

Figure 1:
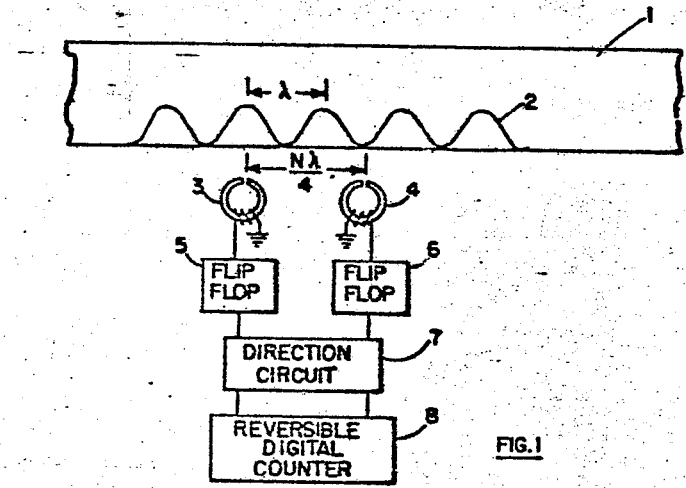

Fig. 1 illustrates a common method of generation of a signal from which must be obtained both quantity and sense. A fixed member 1 has recorded thereon a magnetic track 2, which cooperates with magnetic reading heads 3 and 4 to provide signals to flip-flops 5 and 6, which provide, in turn, signals to direction circuit 7, which provides signals to a reversible digital counter 8. Heads 3 and 4 are indicated as being spaced an odd number (N) quarter wavelengths $$\left(\frac{\lambda}{4}\right)$$

apart, where $\lambda$ is the wavelength of the recording on track 2. These magnetic waves may be recorded as many as a thousand to the inch. It is desirable that in digital counter 8 be recorded the distance heads 3 and 4 move in either direction with respect to member 1. Heads 3 and 4 are spaced a fixed distance apart with respect to each other.

Figure 2:
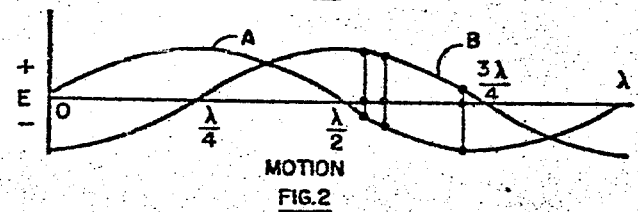
Fig. 2 is an illustration of electrical signals produced by the magnetic heads of Fig. 1.

As the heads 3 and 4 move along the recorded track, electrical signals such as illustrated in Fig. 2, A and B, are generated by the heads 3 and 4, respectively. It is noted that waves A and B are displaced in phase according to the distance of displacement between heads 3 and 4 and in both Figs. 1 and 2 this can be seen to be an odd number of quarter wavelengths $$\left(N\frac{\lambda}{4}\right)$$

Figure 3:
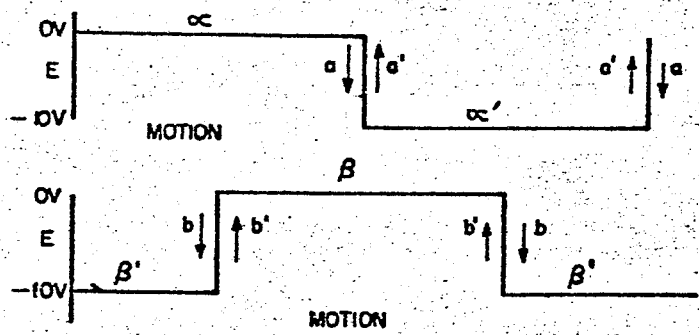
Fig. 3 is an illustration of the signals of Fig. 2 transferred into digital form by a device such as a flip-flop.

The sine wave signals of Fig. 2 are received by flip-flops 5 and 6 and are converted to the square waves illustrated in Fig. 3 as $\alpha$ and $\beta$ which also are displaced in phase an odd number of quarter wavelengths. The signals illustrated in Fig. 2 or Fig. 3 may be generated by many different types of transducer devices, resolvers, magnetic reading devices, analogue to digital converters, and optical, or photosensitive devices. Direction circuit 7 of Fig. 1 receives the outputs of flip-flops 5 and 6 and determines from the information (illustrated in Fig. 3), the motion and direction of the motion of magnetic heads 3 and 4 along track 2. It may be readily understood that curvilinear motion may be involved as well as rectilinear motion.

Assuming that heads 3 and 4 are moving with respect to member 1, we may consider in Fig. 3 that motion is occurring, for example, to the right, moving along the square wave. It may be appreciated from Fig. 3 that the terms $\alpha$ and $\beta$ represent idealized values of the values of waves A and B as might be provided, for example, by flip-flops in response to waves A and B.

A logical equation indicating motion to the right may be written as follows:

$$R = \alpha b' + \alpha \beta + \alpha' b + a' \beta' \quad (1)$$

Motion to the left may be represented as follows:

$$L = \alpha b + a' \beta + \alpha' b' + a \beta' \quad (2)$$

wherein $a$ indicates the change from $\alpha$ to $\alpha'$ and $b'$ indicates change from $\beta'$ to $\beta$, and $a'$ indicates change from $\alpha'$ to $\alpha$ and $b$ indicates change from $\beta$ to $\beta'$. Equation 1 may be interpreted literally as a right motion, R occurs if $\alpha$ and $b'$ exist, or if $a$ and $\beta$ exist, or if $\alpha'$ and $b$ exist, or if $a'$ and $\beta'$ exist. A motion to the left, L, Equation 2, may be interpreted literally as occurring if $\alpha$ and $b$ exist, or if $a'$ and $\beta$ exist, or if $\alpha'$ and $b'$ exist, or if $a$ and $\beta'$ exist. The mechanization of logical Equations 1 and 2 will provide an indication, a pulse on one line, for example, indicating motion along the track 2 in one direction and a pulse on another line indicating motion in the opposite direction. Further, it will be noted from inspection of Fig. 3 that a pulse will be generated every quarter wavelength, increasing the resolution of the recorded track 2. Therefore, by providing two magnetic heads at a fixed displacement, and analyzing the output of the heads by direction circuit 7, which mechanizes Equations 1 and 2, an increased resolution can be obtained of four to one, plus an indication of the direction of motion along track 2. The propositions $\alpha$ and $\alpha'$ represent the two output states of flip-flop 5 and the propositions $\beta$ and $\beta'$ represent the two output states of flip-flop 6, illustrated in Fig. 1.

It is noted that the quantities $a$, $a'$, $b$ and $b'$ are changes in state of the flip-flops and may be obtained, therefore, by differentiating circuits which detect changes in the outputs of the flip-flops 5 and 6. These differentiating circuits are, for example, capacitor and resistor combination such as are well-known in the electronic art.

Figure 4:
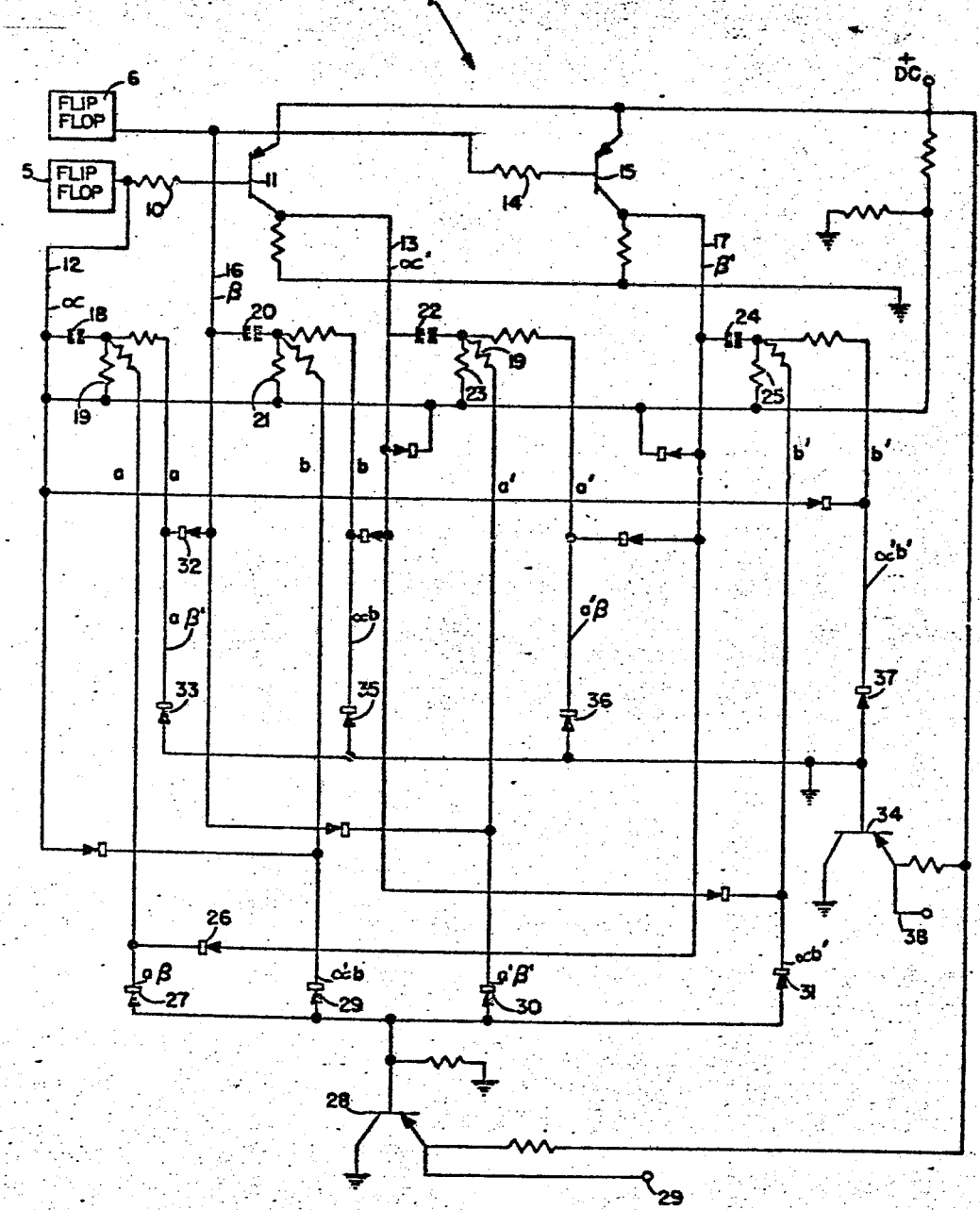
Fig. 4 is one possible logical mechanization of the direction circuit.

In Fig. 4, we may then assume as a convention that if the output of flip-flop 5 is zero volts with respect to ground, the proposition $\alpha$ exists and if it is $-10$ volts, the proposition $\alpha'$ exists. If the output of flip-flop 6 is zero volts, the proposition $\beta$ exists and if the output is $-10$ volts, the proposition $\beta'$ exists. The output of flip-flop 5 is connected to control the base of transistor 11 through resistor 10. Transistor 11 inverts the input signal so that if the output of flip-flop 5 is high, the output of transistor 11 is low. We may say, then, that when line 12 is high, $\alpha$ exists and when line 13 is high $\alpha'$ exists. Flip-flop 6 drives transistor 15 through resistor 14 and when line 16 is high $\beta$ exists and when line 17 is high $\beta'$ exists. It will be noted that $\alpha$ and $\alpha'$ are complementary terms, when one exists, the other does not. The same is true of $\beta$ and $\beta'$. The quantity $a$ ($\alpha$ changing to $\alpha'$) is generated by the differentiating circuit consisting of capacitor 18 and resistor 19, and similarly, the quanity $b$ ($\beta$ changing to $\beta'$) is obtained by capacitor 20 and resistor 21. The quantity $a'$ ($\alpha'$ changing to $\alpha$) is obtained by the differentiating circuit consisting of capacitor 22 and resistor 23, and quantity $b'$ ($\beta'$ changing to $\beta$) is obtained by the differentiating circuit consisting of capacitor 24 and resistor 25. The existence of all necessary propositions can now be determined to provide signals in accordance with the logical Equations 1 and 2.

The term $a \beta$ of Equation 1 is obtained at diode 27. This is, a negative pulse representing $a$ will be allowed to proceed through diode 27 to transistor 28 only if $\beta'$ does not exist (or, what is the same, $\beta$ does exist). If the negative going pulse, $a$, is not shorted out by diode 26, it passes diode 27 to the base of transistor 28 which provides a pulse at output terminal 29 indicating motion in the direction to the right. Similar pulses are received as to $a' b$ (through diode 29), $a' \beta'$ (through diode 30) and $\alpha b'$ (through diode 31).

The term $a \beta'$ of Equation 2 is obtained at diode 33. That is, a negative going pulse representing $a$ will be allowed to proceed through diode 33 to the base of transistor 34 only if $\beta$ does not exist (or, what is the same, $\beta'$ does exist). Similar pulses as to $\alpha b$ (through diode 35) $a' \beta$ (through diode 36) and $\alpha' b'$ (through diode 37) are received at transistor 34. The output terminal 38 of transistor 34 provides pulses indicating the motion in the direction to the left. Each pulse at terminals 29 or 38 indicates a motion by heads 3 and 4, Fig. 2, one-quarter wavelength along recorded track 2.

Figure 5:
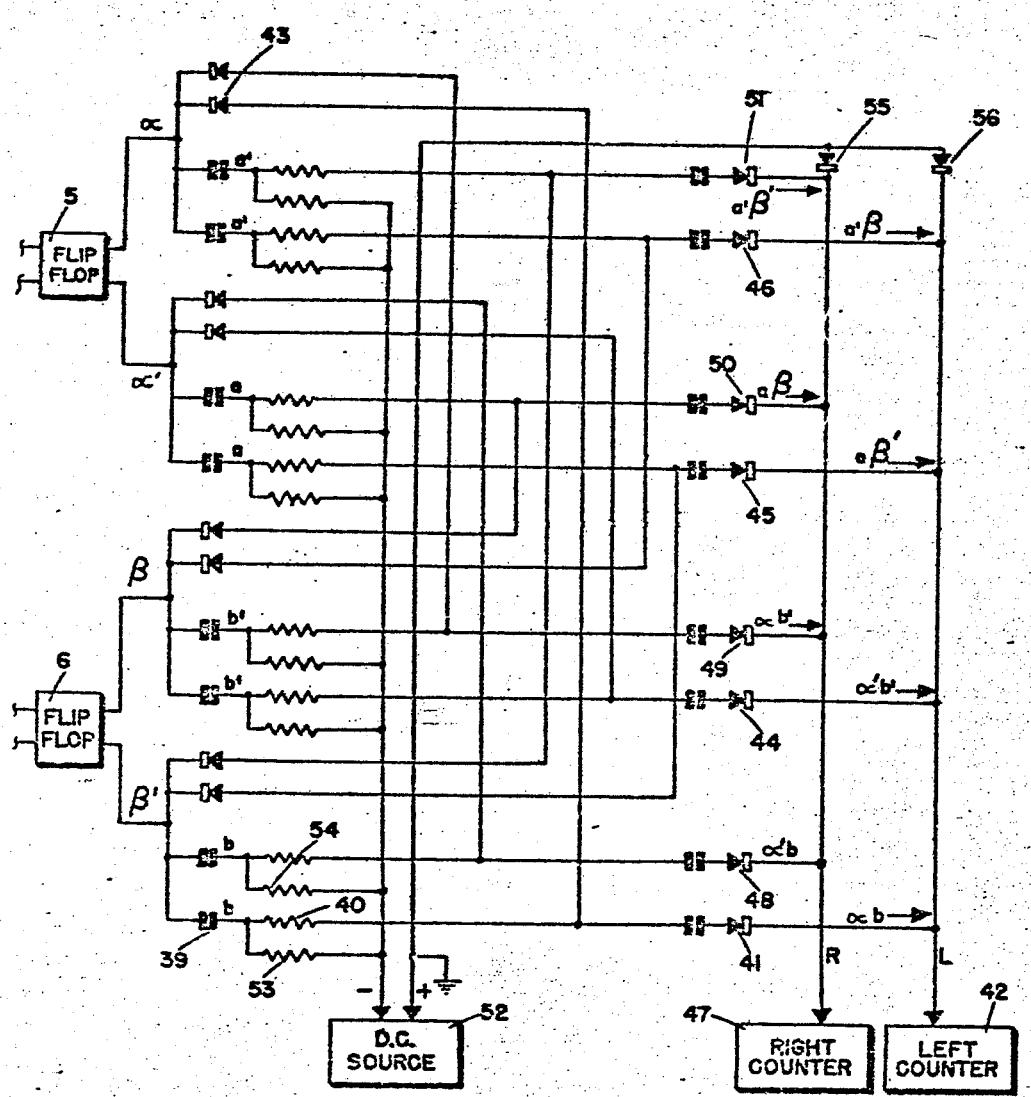
Fig. 5 is a second possible mechanization of the direction circuit.

Fig. 5 is another illustration of how the logic of Equations 1 and 2 may be mechanized. Flip-flop 5, in this instance, provides a double-ended output, one of the lines being labeled $\alpha$ and the other being labeled $\alpha'$. Flip-flop 6 also provides a double-ended output, one line being labeled $\beta$ and the other being labeled $\beta'$. We may choose as a convention that higher voltage on line $\alpha$ indicates that that proposition exists and the higher voltage on the line $\alpha'$ indicates that that proposition exists. The quantities, it will be recalled, are complementary so that the higher voltage can exist on only one of the lines at any particular instant. The same is true of the output of flip-flop 5. These voltages may be assumed to be zero volts in the higher state, and $-10$ volts in the lower state as considered previously. When, for example, flip-flop 6 changes from state $\beta$ to $\beta'$ (indicating the proposition previously described as $b$), a positive pulse passes through capacitor 39 and resistor 40. The pulse can then proceed through diode 41 to right counter 42 unless flip-flop 5 is in the $\alpha'$ state (the $\alpha$ line being $-10$ volts) in which event diode 43 shorts out the pulse. But if the flip-flop 5 is in the $\alpha$ state, diode 43 is biased in the nonconducting direction and the pulse from resistor 40 passes into the left counter, indicating the coincidence of $\alpha$ and $b$, which will be noted from Equation 2 as indicating a motion to the left. Each of the other lines conveys similar logic to the counters. Left counter 42 receives pulses through diode 41 if the proposition $\alpha b$ exists, or through diode 44 if the proposition $\alpha' b'$ exists, or through diode 45 if the proposition $a \beta'$ exists or through the diode 46 if the proposition $a' \beta$ exists. Right counter 47 receives a pulse through diode 48 if the proposition $\alpha' b$ exists, through diode 49 if the proposition $\alpha b'$ exists, through diode 50 if the proposition $a \beta$ exists or through diode 51 if the proposition $a' \beta'$ exists.

D.-C. source 52 holds the lines connected to the resistors, such as 53 and 54, below ground. Thus, output pulses are possible only on line whose control diodes, such as 43, have cathodes at ground (i.e., 0 volts). Diodes 55 and 56 allow only positive pulses to reach the right and left counters.

Figure 6:
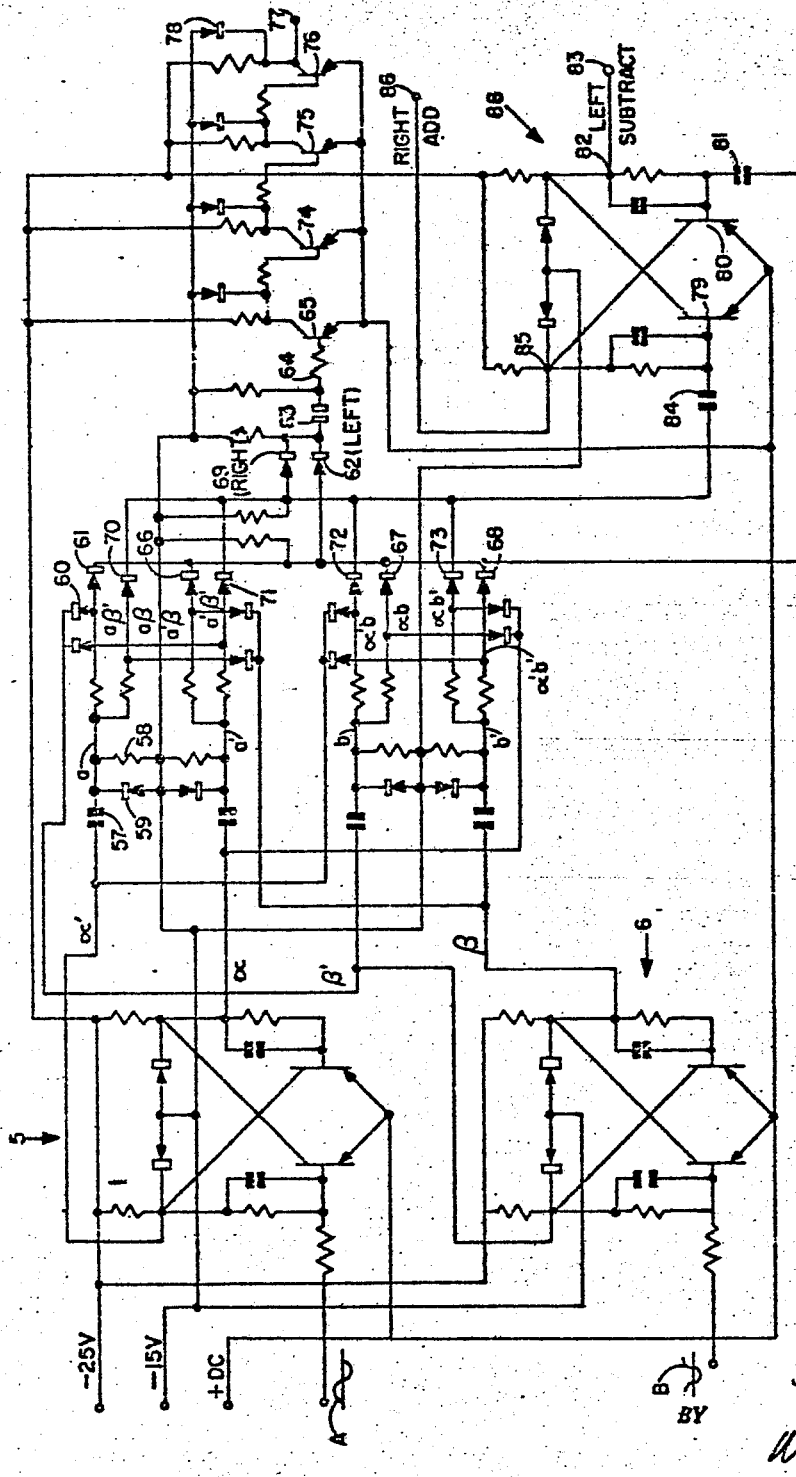
Fig. 6 illustrates another possible mechanization of the direction circuit and flip-flops, in a transistorized version.

Fig. 6 illustrates a transistorized version of the flip-flops 5 and 6 connected to receive input waveforms, such as A and B, as might be received from the transducer illustrated in Fig. 1. The output of flip-flop 5 is on one line $\alpha$ and on the other line $\alpha'$, the previous conventions being adhered to. The output of flip-flop 6 is $\beta$ on one line and $\beta'$ on the other. Differentiating circuit comprised of capacitor 57 and resistor 58, together with clamping diode 59, provides the proposition $a$, which, at the cathode of diode 60, is combined with the proposition $\beta'$, which provides, through diode 61, information as to $a \beta'$ which signal is sent through diode 62 and capacitor 63 and resistor 64 to the base of transistor 65 for amplification. Diode 62 also receives information as to $a' \beta$ through diode 66, information as to $\alpha b$ through diode 67 and information as to $\alpha' b'$ through diode 68. These are the pulses which, by referral to Equation 2, can be seen to indicate motion to the left. It will be noted that capacitor 63 also receives signals through diode 69 which receives the pulses indicating motion in the right direction. The proposition $a \beta$ is received through diode 70, $a' \beta'$ through diode 71, $\alpha' b$ through diode 72 and $\alpha b'$ through diode 73. Therefore, pulses indicating motion to the left and pulses indicating motion to the right are passed to the base of transistor 65 for amplification by successive stages of transistors 65, 74, 75 and 76 to provide an output to a counter, for example, at terminal 77. In the collector stages of these transistors are diode clamps, such as diode 78, to prevent the output at terminal 77 from overshooting a given negative value. Since both right and left pulses are combined and indicated at terminal 77, some means must be provided to indicate whether these pulses are to the left or to the right, or what is the same, whether they are to add or subtract within the counter. This information is obtained by means of a flip-flop 88 having two transistors 79 and 80. The base of transistor 80 receives, through capacitor 81, the output of all diodes connected to the anode of diode 62. These diodes are, of course, indicating motion to the left. If a pulse is received through any of these diodes, transistor 80 ceases conducting, transistor 79 commences conducting, and point 82 becomes more positive providing an output voltage to terminal 83 which indicates a motion to the left and indicates to the counter that the pulses then being received on line 77 should be subtracted. The base of transistor 79 is connected through capacitor 84 to the diodes connected to the anode of diode 69 whose outputs indicate motion in the right direction. If transistor 79 receives a signal from any of these diodes, transistor 79 ceases conducting and transistor 80 commences conducting, at which time, point 85 becomes more positive and provides an output signal at terminal 86 indicating to the counter that the pulses at terminal 77 represent motion to the right and are to be added. It will be noted that this method of handling all the pulses on one line and providing a direction signal on the other line is another form of handling the same information. As can be seen from Fig. 6, transformation from one form (where pulses on one line indicate one direction an pulses on the other indicate the opposite) to the other (where all pulses are received on one line and additional line or lines indicate addition or subtraction) is relatively easy.

Figure 7:
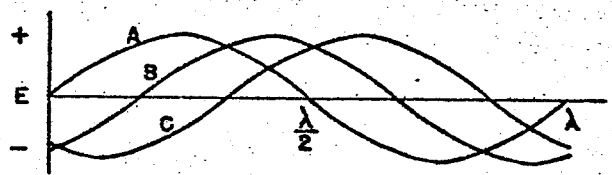
Fig. 7 illustrates signals produced by three magnetic heads.
Figure 8:
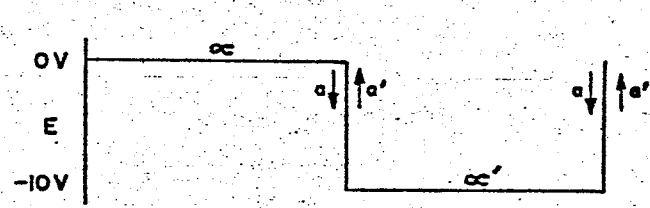
Fig. 8 illustrates three square waves.
Figure 8:
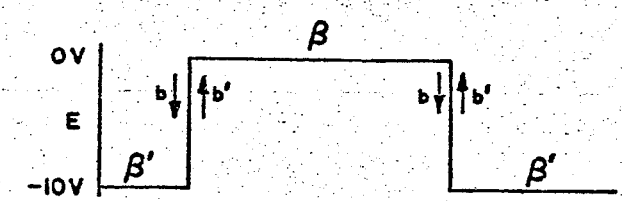
Figure 8:
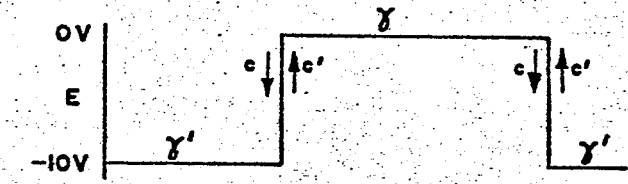

It is apparent that, from the analysis of Figs. 2 and 3, more magnetic heads might be used in which a third wave C is combined with waves A and B, as shown in Fig. 7. Whereas, in the illustration of Fig. 2, waves $\alpha$ and $\beta$ are 90 electrical degrees apart, the waves would be, using three heads, 60 degrees apart. This would mean that the three transducer heads are each located 60 electrical degrees from the others or some multiple of that distance apart to provide a signal 60 electrical degrees from the other waves. The square waves of Fig. 3 would represent the output of three flip-flops each connected to a respective magnetic head. The flip-flop outputs would likewise be square waves $\alpha$, $\beta$ and $\gamma$, each 60 electrical degrees apart, as shown in Fig. 8. A logical equation could then be written as to the motion in the right direction or the left direction as follows:

$$L = \alpha c + \alpha b + \beta' a + \beta' c' + \gamma b' + \gamma a' \quad (3)$$
$$R = \gamma a + \gamma b + \beta' c + \beta' a' + \alpha b' + \alpha c' \quad (4)$$

Mechanization of the equation may then be accomplished according to the teaching of Figs. 4, 5 and 6 providing outputs to a counter. The resolution by such mechanization is increased by the use of three heads.

The novel concept mechanized herein is that from the use of multiple heads up to an indefinite number represented by the letter N, or the Greek letter $\mu$, and the use of devices detecting the changes in outputs, indication of motion to a greater resolution can be obtained, as well as indication of the direction of the motion.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a digital circuit, wherein signals are received having a plurality of digital values, differentiating means for detecting the change in each of said signals from one of said values to the other, means for providing signals in response to the concurrence of a predetermined combination of digital values of certain of said received signals and the changes in the other of said signals, and counter means responsive to the output count of said means for providing signals.

2. The combination recited in claim 1 wherein said signals are of fixed phase with respect to each other.

3. In a binary, digital circuit, wherein signals are received in a plurality of channels, each signal having a first value or a second value, differentiating means for detecting the change in each of said signals from one of said values to the other, means for providing signals in response to the concurrence of a predetermined combination of a signal representing a change in one channel and the digital value of the received signals in the remaining channels, and counter means responsive to the output count of said means for providing signals.

4. In a digital circuit, a plurality of signal channels for receiving a plurality of signals having at least a first value and a second value, electrical differentiating means connected in each said channel providing a signal indicating the change of said received signals from one of said values to the other, signal gating means connected to be controlled by selected combinations of the outputs of said differentiating means and the values of said signal channels, and counter means responsive to the output count of said signal gating means.

5. In a digital circuit, a plurality of signal channels for receiving a plurality of signals having at least a first value and a second value, differentiating means connected in each said channel providing a signal representing the change in value of said received signals in said channels from one of said values to the other, signal gating means connected to be controlled by selected combinations of the outputs of said differentiating means in said channel and the values of said signals in the remaining channels, and counter means responsive to the output count of said signal gating means.

6. In a digital circuit, a plurality of channels for receiving a plurality of input digital signals, a similar plurality of differentiating means as said plurality of channels, each said differentiating means connected in a respective channel, a plurality of gating means each connected to gate the output of a respective differentiating means, said gating means connected to be controlled by selected input signals to said channels, and counter means responsive to the output count of said gating means.

7. In a digital circuit, a plurality of flip-flops each adapted to receive an input signal, a plurality of differentiating means each connected to receive the output of said flip-flops and provide a differentiated output of each of said flip-flops, a plurality of gating means each connected to gate the output of a respective differentiating means of the output of said flip-flops, said gating means connected to be controlled by selected outputs of said flip-flops, and counter means responsive to the output count of said gating means.

8. In a digital circuit wherein input signals are received having a plurality of digital values, electrical differentiating means for detecting each change in said input signals from one of said values to the other, electrical gating means providing signals in response to the concurrence of predetermined combinations of values of said input signals and the outputs of said electrical differentiating means, and counter means responsive to the output count of said electrical gating means.

9. In a binary, digital circuit, a plurality of flip-flops, each adapted to receive an input signal, a plurality of electrical differentiating means, said differentiating means connected to provide a differentiated output of each of said flip-flops, a plurality of signal gating means each connected to gate the output of a respective electrical differentiating means, said signal gating means connected to be controlled by selected outputs of the remainder of said flip-flops, and counter means responsive to the output count of said signal gating means.

10. In a digital, binary circuit wherein a plurality of signals are received, each of said signals having a first value represented as A . . . N, and a second value represented as A' . . . N', differentiating circuit means for detecting the change, represented as $a'$ . . . $n'$, of each of said signals from its first value to its second value, and differentiating circuit means for detecting the change, represented as $a$ . . . $n$, of each of said signals from its second value to its first value, gating means providing signals upon the concurrence of predetermined combinations of said change signals $a \ldots n$, and $a' \ldots n,'$ and said $A \ldots N$ and said $A' \ldots N'$ signal values, and counter means responsive to the output count of said gating means.

11. The combination recited in claim 10 wherein said gating means provides a signal, R, indicating the predetermined combination of signals represented in logical equation notation as:

$$R = \alpha b' + a\beta + a'b + \alpha'\beta'$$

and said gating means provides a signal, L, indicating the predetermined combination of signals represented in logical equation notation as:

$$L = \alpha b + a'\beta + a'b' + a\beta'$$

wherein the characters $\alpha$ and $\beta$ represent idealized values of the values of signals A and B, respectively, wherein B represents one of the plurality of signals included in the series $A \ldots N$.

12. In a digital circuit, first and second flip-flops, first and second differentiating means connected to the first terminal of the first of said flip-flops, third and fourth differentiating means connected to the second terminal of said first flip-flop, fifth and sixth differentiating means connected to the first terminal of said second flip-flop, seventh and eighth differentiating means connected to the second terminal of said second flip-flop, first gating means connected to gate the output of said first differentiating means, said first gating means connected to be controlled by the output of the second terminal of said second flip-flop, second gating means connected to gate the output of said second differentiating means, said second gating means connected to be controlled by the output of the first terminal of said second flip-flop, third gating means connected to gate the output of said third differentiating means, said third gating means connected to be controlled by the output of the first terminal of said second flip-flop, fourth gating means connected to gate the output of said fourth differentiating means, said fourth gating means connected to be controlled by the output of the second terminal of said second flip-flop, fifth gating means connected to gate the output of said fifth differentiating means, said fifth gating means connected to be controlled by the output of the first terminal of said first flip-flop, sixth gating means connected to receive the output of said sixth differentiating means, said sixth gating means connected to be controlled by the output of the second terminal of said first flip-flop, seventh gating means to gate the output of said seventh differentiating means, said seventh gating means connected to be controlled by the output of the second terminal of said first flip-flop, eighth gating means connected to receive the output of said eighth differentiating means, said eighth gating means connected to be controlled by the output of the first terminal of said first flip-flop, and counter means connected to receive the output count of said gating means.

References Cited in the file of this patent
UNITED STATES PATENTS

| | | |
|---|---|---|
| 2,685,082 | Bemon et al. | July 27, 1954 |
| 2,717,987 | Hagen | Sept. 13, 1955 |
| 2,733,431 | Steele | Jan. 31, 1956 |
| 2,774,957 | Towner | Dec. 18, 1956 |
| 2,788,519 | Caldwell | Apr. 9, 1957 |